United States Patent
Naruoka et al.

(10) Patent No.: US 9,303,603 B2
(45) Date of Patent: Apr. 5, 2016

(54) AIR INTAKE STRUCTURE FOR VEHICLE

(71) Applicant: Kawasaki Jukogyo Kabushiki Kaisha, Hyogo (JP)

(72) Inventors: Shohei Naruoka, Kakogawa (JP); Yoshinobu Tanaka, Hyogo (JP)

(73) Assignee: KAWASAKI JUKOGYO KABUSHIKI KAISHA, Kobe-Shi, Hyogo (JP)

( * ) Notice: Subject to any disclaimer, the term of this patent is extended or adjusted under 35 U.S.C. 154(b) by 0 days.

(21) Appl. No.: 14/590,884

(22) Filed: Jan. 6, 2015

(65) Prior Publication Data

US 2015/0114744 A1    Apr. 30, 2015

Related U.S. Application Data

(63) Continuation of application No. PCT/JP2013/068910, filed on Jul. 10, 2013.

(30) Foreign Application Priority Data

Jul. 11, 2012    (JP) .................................. 2012-155462

(51) Int. Cl.
*F02M 35/10* (2006.01)
*F02M 35/16* (2006.01)
(Continued)

(52) U.S. Cl.
CPC ................ *F02M 35/14* (2013.01); *B62J 25/00* (2013.01); *B62J 37/00* (2013.01); *B62K 11/04* (2013.01); *F01P 1/06* (2013.01); *F02B 27/005* (2013.01); *F02B 33/40* (2013.01); *F02B 33/44* (2013.01); *F02M 35/10* (2013.01); *F02M 35/10013* (2013.01); *F02M 35/10078* (2013.01); *F02M 35/10111* (2013.01); *F02M 35/10144* (2013.01); *F02M 35/10157* (2013.01); *F02M 35/162* (2013.01); *F02B 37/00* (2013.01); *F02B 61/02* (2013.01); *Y02T 10/146* (2013.01)

(58) Field of Classification Search
CPC .......... B62K 11/04; F02B 37/00; F02B 61/02
See application file for complete search history.

(56) References Cited

U.S. PATENT DOCUMENTS 4,482,024 A * 11/1984 Matsuda et al. ............... 180/219
4,709,774 A * 12/1987 Saito et al. .................... 180/229
(Continued)

FOREIGN PATENT DOCUMENTS

| JP | 57-137531 | 2/1981 |
|---|---|---|
| JP | 64-47975 | 3/1989 |

(Continued)

OTHER PUBLICATIONS

PCT Application No. PCT/JP2013/068910 International Preliminary Report on Patentability dated Jan. 22, 2015, 10 pages.
(Continued)

*Primary Examiner* — Tony Winner

(57) ABSTRACT

A combustion engine mounted on a motorcycle includes an engine rotary shaft extending in a vehicle widthwise direction and a supercharger disposed rearwardly of a cylinder block. The combustion engine also includes an air intake duct through which an incoming wind flowing forwardly of a traveling direction with respect to the combustion engine is introduced into the supercharger. The air intake duct is fluid connected with an air intake port of the supercharger after having passed laterally of the combustion engine.

20 Claims, 10 Drawing Sheets

(51) Int. Cl.
- *F02B 33/40* (2006.01)
- *B62K 11/04* (2006.01)
- *F02M 35/14* (2006.01)
- *F02B 27/00* (2006.01)
- *F01P 1/06* (2006.01)
- *B62J 25/00* (2006.01)
- *B62J 37/00* (2006.01)
- *F02B 33/44* (2006.01)
- *F02B 37/00* (2006.01)
- *F02B 61/02* (2006.01)

(56) References Cited

U.S. PATENT DOCUMENTS

| | | | |
|---|---|---|---|
| 4,735,178 A * | 4/1988 | Inoue et al. | 180/219 |
| 7,380,624 B2 | 6/2008 | Momosaki | |
| 7,549,493 B1 * | 6/2009 | Jones | 180/68.3 |
| 8,707,931 B2 | 4/2014 | Arima et al. | |
| 2005/0051375 A1 | 3/2005 | Momosaki | |
| 2012/0192839 A1 | 8/2012 | Arima et al. | |

FOREIGN PATENT DOCUMENTS

| | | |
|---|---|---|
| JP | 02-070920 | 3/1990 |
| JP | 02-175489 | 7/1990 |
| JP | 05-116667 | 5/1993 |
| JP | 7-038067 | 8/1995 |
| JP | 2005-083279 | 3/2005 |
| JP | 2011-202595 | 10/2011 |
| WO | WO2011/046098 | 4/2011 |
| WO | 2011/117919 | 9/2011 |

OTHER PUBLICATIONS

PCT/JP2013/068910 International Search Report, Sep. 4, 2013, 2 pages.
Notification of Reason(s) for Rejection issued Dec. 8, 2015 for Japan Patent Application No. 2014-524850 (with English translation summary).

* cited by examiner

AIR INTAKE STRUCTURE FOR VEHICLE

CROSS REFERENCE TO THE RELATED APPLICATION

This application is a continuation application, under 35 U.S.C §111(a) of international application No. PCT/JP2013/068910, filed Jul. 10, 2013, which claims priority to Japanese patent application No. 2012-155462, filed Jul. 11, 2012, the entire disclosure of which is herein incorporated by reference as a part of this application.

BACKGROUND OF THE INVENTION

1. Field of the Invention

The present invention relates to a combustion engine which is mounted on a saddle riding type vehicle and in which an intake port is positioned rearwardly of a cylinder head.

2. Description of Related Art

As a combustion engine mounted on an automotive vehicle such as, for example, a motorcycle, the combustion engine has been known in which an intake port is disposed rearwardly of a cylinder head of the combustion engine so that an air drawn from the front of the combustion engine may be introduced into the intake port through an intake duct passing above the combustion engine. In this respect, see, for example, the patent document 1 listed below.

Prior Art Literature

Patent Document 1: JP Laid-open Patent Publication No. 2005-083279

It has, however, been that according to the disclosure of the patent document 1 referred to above, since the intake duct extends from the front of the combustion engine to the rear thereof after having passed above the combustion engine, the space above the combustion engine tends to be downtrodden. Accordingly, the degree of freedom in designing instruments is indeed lowered. By way of example, where the fuel tank is to be disposed above the combustion engine, it has been found difficult to increase the capacity of the fuel tank.

SUMMARY OF THE INVENTION

In view of the above, the present invention has been devised to resolve the foregoing problems and inconveniences and is intended to provide a combustion engine for use in a saddle riding type vehicle, which permits the space above the combustion engine to be acquired to thereby increase the degree of freedom in designing.

In order to accomplish the foregoing object of the present invention, the present invention provides an engine mounted on a saddle riding type vehicle and having an engine rotary shaft extending in a widthwise direction of a vehicle body, which engine includes a crankcase to support the engine rotary shaft, a cylinder block to protrude upwardly from the crankcase, a cylinder head mounted on the cylinder block, an air intake portion disposed rearwardly of the cylinder block and operable to supply an intake air to the engine, and an air intake duct fluid connected with an air intake port of the air intake portion and operable to guide an incoming wind, which flows forwardly of the engine, towards the air intake portion. In the engine referred to above, the air intake port is positioned below an upper end of the cylinder head and, also, the air intake duct passes a lateral space of the cylinder block and below the cylinder head. The air intake duct has an inner side surface with respect to the vehicle widthwise direction, with the inner side face being curved at a position forwardly of the air intake port of the air intake portion in a direction inwardly of the vehicle widthwise direction towards a rear.

According to the present invention, since the air intake duct extends from forwardly of the engine towards rearwardly of the engine while passing laterally of the cylinder block, a space above the engine and a space laterally thereabove will not be wasted. As a result, the degree of freedom in designing the layout of instruments increase. Where by way of example the fuel tank is to be disposed above the engine, a large capacity of the fuel tank can be secured. Also, since an inner side surface of the air intake duct is curved at a location forwardly of the air intake port of the air intake portion, a smoothly curved path can be easily formed and the flow resistance in the air intake passage can be reduced.

As a preferred form of the present invention, the air intake portion referred to above may be a supercharger to supply an intake air under pressure. According to the use of the supercharger for the air intake portion, the increase of the intake air pressure achieved by the supercharger is effective to increase the air intake efficiency of the engine. Also, the use of the supercharger may render the flow velocity of the intake air, then flowing through the air intake duct, to attain an extremely high value and the increase of the flow resistance may result in. However, according to the present invention, the flow resistance can be reduced as hereinabove discussed and, accordingly, even where the supercharger is used, an undesirable lowering of the engine output can be suppressed.

Where the supercharger discussed above is used, the supercharger referred to above is preferably positioned above the crankcase. According to this feature, since the supercharger is positioned rearwardly of the cylinder block when viewed from side, the air intake duct can be connected with the supercharger while the curvature of the air intake duct, then passing laterally of the cylinder block, in an up and down direction (vertical direction) is suppressed.

Also, where the supercharger is used as discussed above, a power transmitting unit to transmit the power of the engine to the supercharger is preferably disposed on one side opposite to the air intake port of the supercharger with respect to the vehicle widthwise direction. According to the use of the power transmitting unit as discussed above, since the air intake port and the power transmitting unit are separated a distance away from each other in the vehicle widthwise direction, a space around the engine can be further efficiently utilized without allowing the interference between the air intake duct and the power transmitting unit.

Where the supercharger is used as discussed above, the air intake port of the supercharger is preferably positioned above a rear portion of the crankcase, in which case an intake air chamber may be disposed between a discharge port of the supercharger and the air intake port of the engine in a direction conforming to a forward and rearward direction. In this case, the intake air may be introduced into the air intake port after having flown from the supercharger and then through the intake air chamber, and a downstream portion of the air intake duct may extend below the intake air chamber, with the downstream portion being positioned at the lateral region of the cylinder block and at its downstream side.

According to this structural feature referred to above, the air intake port is disposed at a location above a rear portion of the crankcase, that is, at a location separated a considerable distance from the cylinder block. Therefore, the air intake duct can be curved in a relatively large radius of curvature after the passage of laterally of the cylinder block. Positioning of the air intake port rearwardly allow the supercharger as a whole, including the discharge port, to be disposed rearwardly. Accordingly, the dimension of the intake air chamber in the forward and rearward direction can be increased and, as a result, without increasing the dimension in the up and down direction of the intake air chamber, the chamber capacity can be reduced. Suppression of the dimension of the intake air chamber in the up and down direction is effective to avoid the interference between the intake air chamber and the air intake duct, and also to further avoid any possibility of the space above the engine being reduced.

In another preferred embodiment of the present invention, the air intake duct preferably has an introducing port defined at a front end thereof, the introducing port being positioned at a heightwise position level with the air intake port of the air intake portion or above it. According to this structural feature, the introducing port of the air intake duct is separated away from the road surface and, therefore, an undesirable ingress of, for example, rainwater and/or muddy water through the introducing port can be suppressed.

In a further preferred embodiment of the present invention, a lowermost portion of an undersurface of the air intake duct is preferably provided at an intermediate location of the air intake duct with respect to the forward and rearward direction, and a drain hole is provided in the lowermost portion. According to this structural feature, even when rainwater may ingress into the air intake duct, the rainwater can be discharged to the outside from an outlet of the air intake duct, that is, from a drain hole to the outside before the rainwater reaches the air intake port of the air intake portion, thereby avoiding the undesirable ingress of the rainwater into the air intake portion.

In a still further embodiment of the present invention, the air intake duct is preferably disposed on one side of the engine, in which case a use is made of a valve driving force transmitting mechanism to transmit the power of the engine into intake and exhaust valves. This valve driving force transmitting mechanism may be disposed on the other side opposite to such one side of the engine. According to this structural feature, since the air intake duct can be disposed in a vacant space available on a side opposite to the valve driving force transmitting mechanism such as, for example, a cam chain, the space around the engine can be further efficiently utilized.

In a yet preferred embodiment of the present invention, the air intake duct preferably includes a first duct portion, which extends in a forward and rearward direction of the vehicle body while passing on one side of the engine from forwardly of the vehicle body, and a second duct portion which is continued to a rear end of the first duct portion and is curved in towards an inner side of the vehicle body. In this case, the second duct portion is fluidly connected with the air intake port at a location rearwardly of the cylinder block, the air intake port is disposed on an inner side of the one side of the engine with respect to a vehicle widthwise direction; and the second duct portion is formed with an air reserving portion having a passage surface area that is set to be greater than the first duct portion. According to this structural ercharger discharge port extends upward along a rear side of the supercharger for connection output can be increased. Also, by way of example, such an air reserving portion may be used as an air cleaner chamber. Since the dimension in the vehicle widthwise direction does not increase even if the passage surface area of the second duct portion that extends on an inner side of the vehicle body, the air reserving portion can be accommodated within the width of the engine.

In the practice of the present invention, a high order portion positioned above the introducing port at the front end of the air intake duct is preferably formed at an intermediate portion of the air intake duct. According to this structural feature, in the presence of the high order portion, water entering from the introducing port together with the incoming wind can be prevented from entering the supercharger.

The engine designed in accordance with the present invention as hereinabove described is preferably mounted on an automotive vehicle having an vehicle frame structure. This vehicle frame structure extends from a handlebar post towards the rear of the vehicle body on an inner side of a side surface of the engine on that side in which the air intake duct is disposed. The use of the engine of the present invention in the automotive vehicle of the type specified above is effective to avoid the interference between the vehicle frame structure and the air intake duct and also to avoid an undesirable increase in dimension in the vehicle widthwise direction.

A motorcycle to which the present invention is applied makes use of the engine of the type defined above and including a front wheel support arm, that extends forwardly from a vehicle frame, to support the front wheel at a location below the air intake duct. According to the motorcycle utilizing the engine of the present invention, the interference between the front wheel support arm and the air intake duct is avoided, and the undesirable increase in dimension in the motorcycle widthwise direction is suppressed.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF PREFERRED EMBODIMENTS

Preferred embodiments of the present invention will be hereinafter described in detail. It is, however, to be noted that the terms "left" and "right" used herein are to be understood as relative terms used to denote opposite directions or positions, respectively, as viewed from a vehicle driver then maneuvering the automotive vehicle.

Figure 1:
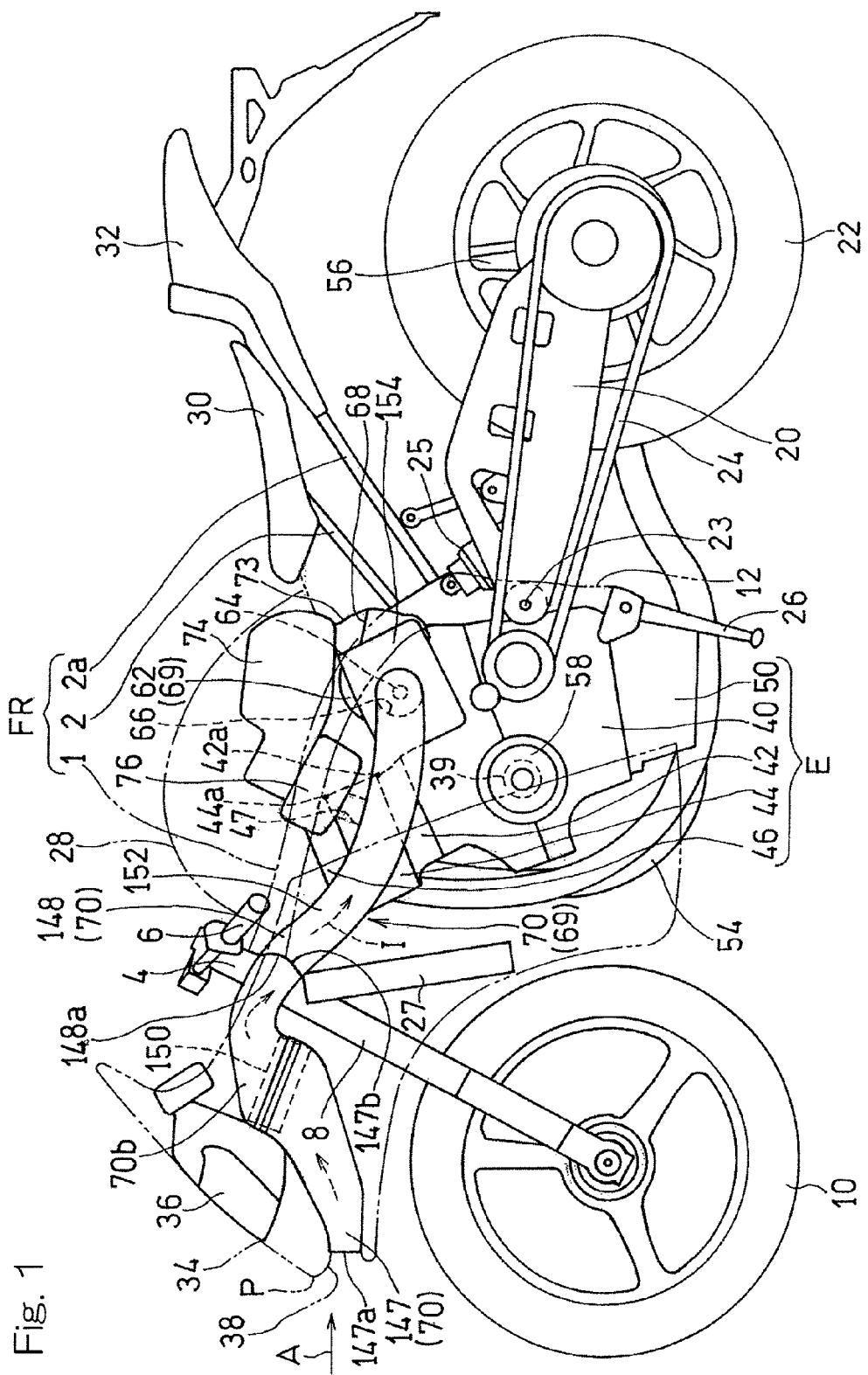
FIG. 1 is a side view showing a motorcycle having mounted thereon a combustion engine designed in accordance with a first preferred embodiment of the present invention.

FIG. 1 illustrates a side view showing a motorcycle, which is one kind of the saddle riding type vehicles and has mounted thereon a combustion engine designed in accordance with a first preferred embodiment of the present invention. The illustrated motorcycle frame structure FR has a front half frame section and a rear half frame sections, which are generally opposite to each other. The front half frame section includes a main frame 1, and the rear half frame section includes a seat rail 2 and a reinforcement rail 2a. The seat rail 2 and the reinforcement rail 2a are fitted to a rear frame portion of the main frame 1. The main frame 1 has a front end formed integrally with a head pipe 4, and a front fork 8 is rotatably supported by such head pipe 4 through a steering shaft (not shown). A front wheel 10 is mounted on a lower end portion of the front fork 8, and a steering handlebar 6 is fixed to an upper end portion of the front fork 8. In other words, the head pipe 4 functions as a handlebar post, and the main frame 1, which is a part of the motorcycle frame structure FR, extends from the head pipe 4 in a direction rearwardly of the motorcycle body.

On the other hand, a swingarm bracket 12 is provided in a rear end portion of the main frame 1, which is a lower intermediate portion of the motorcycle frame structure FR, and a swingarm 20 is supported by the swingarm bracket 12 for movement up and down. A rear wheel 22 is supported by a rear end portion of the swingarm 20 for pivotal movement about a pivot pin 23.

A motorcycle combustion engine E is mounted on the lower intermediate portion of the motorcycle frame structure FR and positioned on a front side of the swingarm bracket 12. An engine power of the combustion engine E is transmitted to a transmitting mechanism 24 such as, for example, a substantially endless chain, and the rear wheel 22 is driven through this transmission mechanism 24. The combustion engine E is in the form of a parallel multicylinder engine in the form of, for example, a four-cylinder, four-cycle combustion engine. It is, however, to be noted that the type of the combustion engine E is not necessarily limited to that referred to above.

A rear portion cushioning mechanism 25 is connected between the rear frame 2 and the swingarm 20. This rear portion cushioning mechanism 25 serves to buffer a load imposed between the rear wheel 22 and the rear frame 2. A kickstand 26 is supported at a lower portion of the swingarm bracket 12 for movement between erected and folded position. A radiator 27 for cooling an engine cooling water is disposed forwardly of the combustion engine E.

A fuel tank 28 is disposed on an upper portion of the main frame 1, and a driver's seat 30 and a fellow passenger's seat 32 are supported by the rear frame 2. Also, a front cowling 34, made of a resinous material, is mounted on a front portion of the motorcycle body or motorcycle frame structure FR so as to cover an area ranging from forwardly of the head pipe 4 to opposite lateral portions of the front portion of the motorcycle body. The front cowling 34 has a headlamp unit 36 mounted thereon. The front cowling 34 is formed with an air intake opening 38 for introducing the ambient air therethrough into the combustion engine E. The air intake opening 38 is positioned below the headlamp unit 36.

With the air intake opening 38 open in a direction forwardly of the motorcycle body, the amount of air drawn towards the combustion engine E can be increased by the utilization of the wind pressure of the incoming wind A. The air intake opening 38 is disposed in a front surface of the front cowling 34 and positioned at a nose portion of the front cowling 34 at which the highest wind pressure of the incoming wind is available. In the illustrated embodiment, the air intake opening 38 is shown as positioned below the headlamp unit 36, but it may be positioned above the headlamp unit 36, or at a position intermediate between two headlamps spaced apart from each other in a direction laterally of the motorcycle body in the case of any known twin headlamp structure.

The combustion engine E includes an engine driven rotary shaft 39 extending in a direction parallel to the widthwise direction of the motorcycle body, a crankcase 40 supporting the engine driven rotary shaft 39, a cylinder block 42 protruding upwardly from the crankcase 40 and having a cylinder head 44 mounted on the cylinder block 42, a head covering 46 fitted to an upper portion of the cylinder head 44, and an oil pan 50 provided beneath the crankcase 40. In this embodiment, the crankcase 40 has a rear portion concurrently serving as a transmission casing. The cylinder block 42 is somewhat tilted forwardly. The head covering 46 covers a cam mechanism (not shown) for intake and exhaust valves. The cylinder head 44 has a rear portion provided with an air intake port 47.

An exhaust port at a front surface of the cylinder head 44 is fluidly connected with four exhaust pipes 54. Those four exhaust pipes 54 are merged together at a location beneath the combustion engine E and then fluid connected with an exhaust muffler 56, which is disposed on a right side of the rear wheel 22. An electric generator (not shown) is connected at a laterally outer side of the engine driven rotary shaft 39, specifically on the right side thereof in the illustrated embodiment, and a generator covering 58 covers the electric generator from an outer side.

Figure 2:
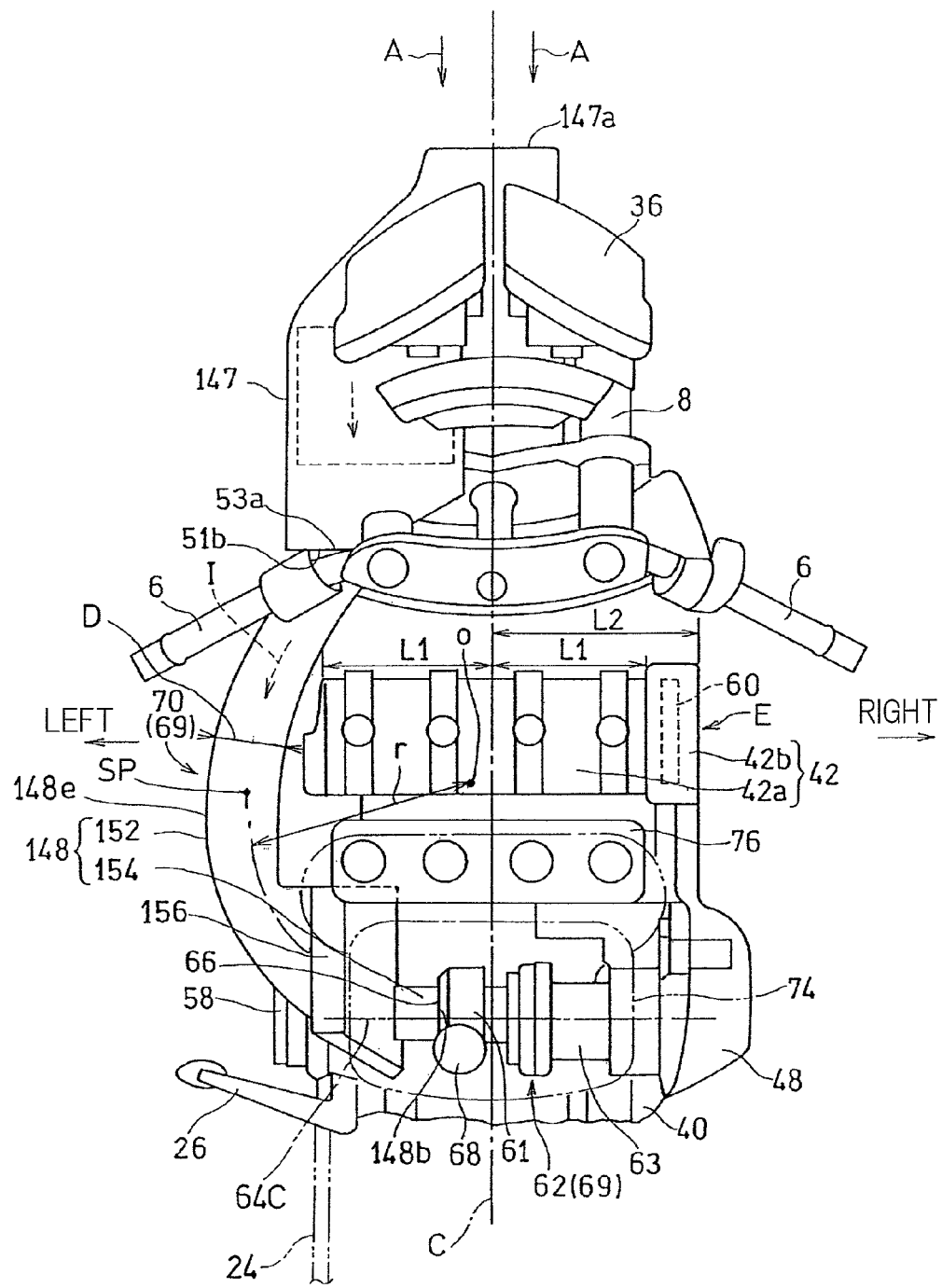
FIG. 2 is a schematic fragmentary top plan view of the motorcycle with a portion thereof removed.

As shown in FIG. 2, on the right side of the combustion engine E, a valve driving force transmitting mechanism 60 for transmitting the engine power of the combustion engine E to the intake and exhaust valves referred to previously is disposed. Although the illustrated embodiment is shown as utilizing a cam chain as the valve driving force transmitting mechanism 60, it is not necessarily limited thereto and a push rods or gears, for example, may be employed. It is to be noted that in FIGS. 2, 3 and 4, the motorcycle frame structure FR, the fuel tank 28 and an intake air chamber 74 as will be detailed later are not shown therein for the sake of clarity.

The cylinder block 42 is formed with a combustion chamber defining segment 42a for defining a combustion chamber for each of the engine cylinders and a transmitting mechanism accommodating segment 42b for accommodating therein a part of a valve driving force transmitting mechanism 60 adjacent to the combustion chamber defining segment 42a. If as is the case with the embodiment now under discussion, a cam chain is used as the valve driving force transmitting mechanism 60, the transmitting mechanism accommodating segment 42b is formed as a cam chain tunnel. The combustion chamber defining segment 42a has a motorcycle widthwise intermediate position disposed in the vicinity of a longitudinal center line C of the motorcycle body that extends in a direction parallel to the longitudinal sense of the motorcycle. In other words, the cylinder block 42 has a distance L2 which is measured from the longitudinal center line C of the motorcycle body to a right side end portion where the transmitting mechanism accommodating segment 42b is formed, which distance L2 is greater than the distance L1 from the longitudinal center line C of the motorcycle body to a left side end portion, and does hence protrude towards laterally rightwardly of the motorcycle widthwise direction.

As shown in FIG. 1, a supercharger 62 is disposed rearwardly of the cylinder block 42 and above the crankcase 40. This supercharger 62 forms an air intake portion through which the ambient air is drawn and is then supplied towards the combustion engine E. The supercharger 62 has a supercharger rotating shaft 64 extending in a direction widthwise of the motorcycle body, an intake port 66 open leftwards, and a discharge port 68 disposed at a portion of the combustion engine E intermediate of the motorcycle widthwise direction. The discharge port 68 is positioned rearwardly of the supercharger rotating shaft 64.

The intake port 66 of the supercharger 62 is disposed above an upper surface of the crankcase 40 and inwardly of a left side surface of the cylinder block 42 with respect to the motorcycle widthwise direction. This intake port 66 is fluid connected with an air intake duct 70. This air intake duct 70 serves to introduce the incoming wind A, then flowing forwardly of the cylinder block 42, into the supercharger 62. The supercharger 62 and the air intake duct 70 cooperate with each other to form a supercharger device 69 operable to supply the air under pressure into the engine cylinder. The detail of the air intake duct 70 will be described later.

Figure 3:
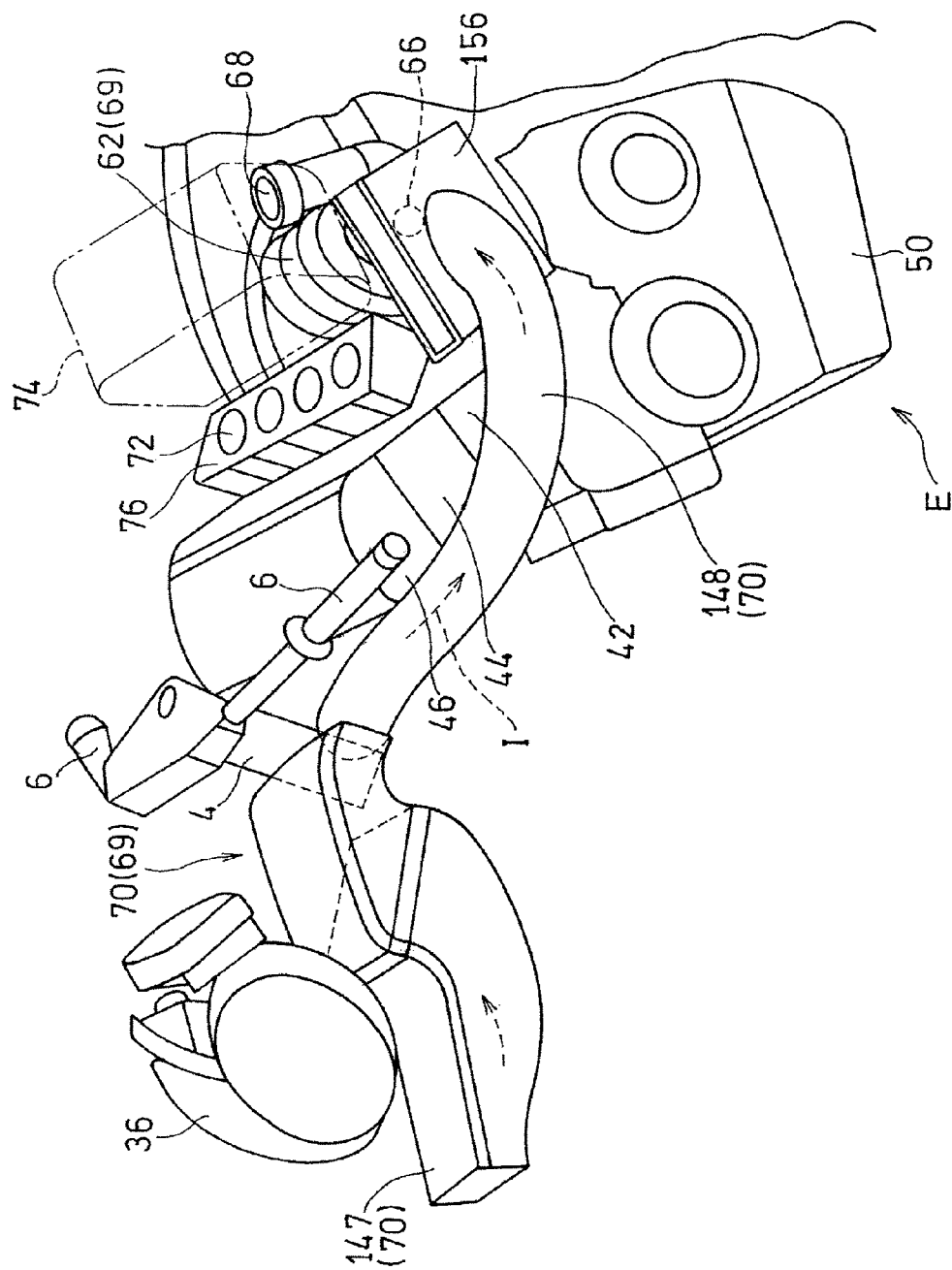
FIG. 3 is a perspective view, as viewed in a direction forwardly upwardly of the motorcycle, showing an important portion of the motorcycle.
Figure 4:
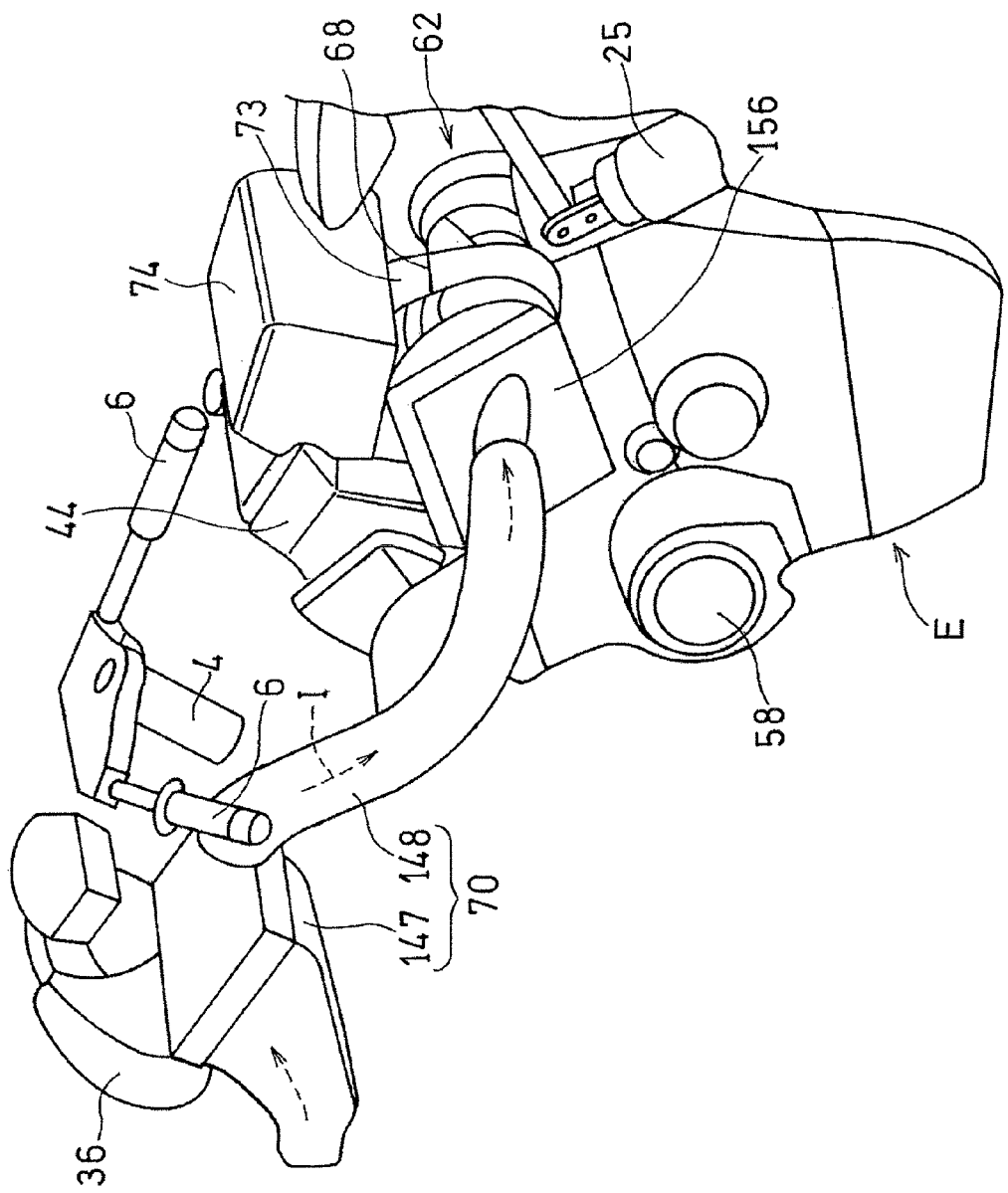
FIG. 4 is a perspective view of that important portion of the motorcycle as viewed rearwardly upwardly.

Referring now to FIG. 3, the discharge port 68 of the supercharger 62 opens upwardly. An intake air chamber 74 is disposed between the discharge port 68 and the air intake port 47 (best shown in FIG. 1) of the combustion engine E. The intake air chamber 74 serves to pool therein the intake air that is supplied from the supercharger 62 to the air intake port 47 of each of the plurality of the engine cylinders. The intake air chamber 74 extends over the substantially entire length of the cylinder block 42 in the motorcycle widthwise direction and is, as shown in FIG. 4, disposed upwardly of the supercharger 62 and rearwardly of the cylinder block 42.

A pipe 73 between the supercharger 62 and the intake air chamber 74 is fluid connected at an intermediate portion of the intake air chamber 74 with respect to the motorcycle widthwise direction. Accordingly, the intake air from the supercharger 62 shown in FIG. 1 flows uniformly into the plurality of the air intake ports 47. A throttle body 76 is disposed between the intake air chamber 74 and the cylinder head 44. In this throttle body 76, fuel is jetted into the intake air to form an air/fuel mixture, and this resultant air/fuel mixture is supplied into the cylinder. The fuel tank 28 referred to previously is disposed above the intake air chamber 74 and the throttle body 76.

The supercharger 62 pressurize the air, which has been drawn through the intake port 66, and supplies it to the combustion engine E after the pressure has been increased and then discharged from the discharge port 68. Accordingly, the amount of the intake air supplied to the combustion engine E can be increased. The discharge port 68 has an axial line that is tilted forwards and upwardly. By this design, the intake air can be smoothly guided towards the intake air chamber 74. As shown in FIG. 2, when the discharge port 68 of the supercharger 62 and the motorcycle widthwise intermediate position of the combustion chamber defining segment 42a of the cylinder block 42 are held at the substantially same position, an undesirable bias of the flow of the intake air towards each of the engine cylinder can be avoided.

Figure 5:
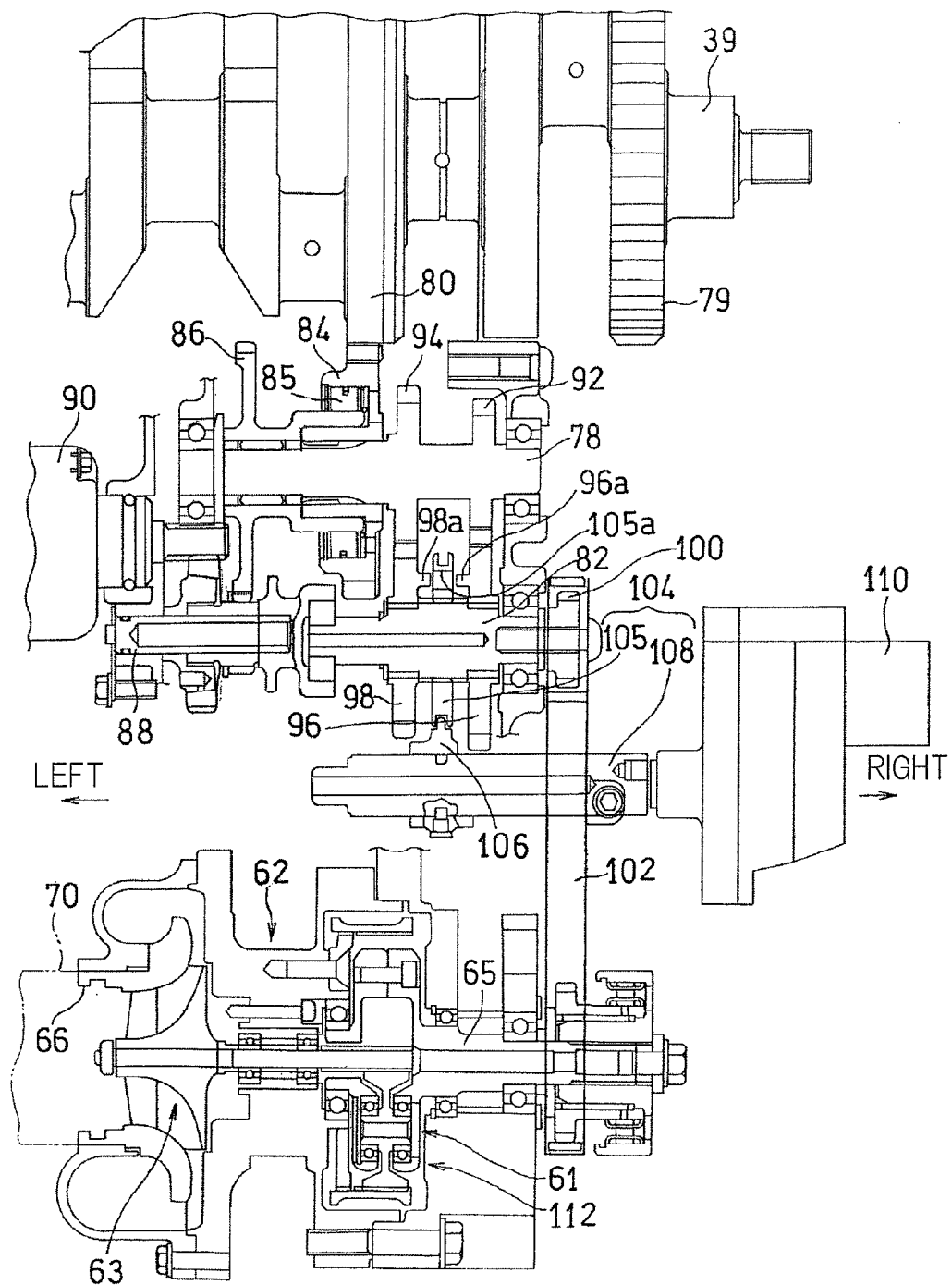
FIG. 5 illustrates an arrangement of shafts, used in a power train of the motorcycle, showing a supercharger device used therein.

As shown in FIG. 5, the crankshaft 39, which is the rotary shaft of the combustion engine E referred to previously, is provided with a crank gear 80. The crank gear 80 is formed in an inner web at a location inwardly of a clutch gear 79. This crank gear 80 is meshed with a drive gear 84 to drive a countershaft 78. A supercharger drive shaft 82 is disposed on one side opposite to the crankshaft 39 with respect to the countershaft 78. The countershaft 78 and the supercharger drive shaft 82 have respective axes that extend parallel to the crankshaft 39. The drive gear 84 is splined to the countershaft 78 for rotation together therewith. A starter gear 86 is relatively rotatably supported by the countershaft 78, and one way clutch 85 is interposed between the drive gear 84 and the starter gear 86.

The starter gear 86 is connected with a starter motor 90 through a torque limiter 88. Accordingly, when the starter motor 90 revolves while the combustion engine E is in a halted condition, the one way clutch 85 is brought in a coupled position to allow a starting torque to be transmitted to the crankshaft 39. Also, when the rotational speed of the crankshaft 39 is driven at a speed higher than that of the starter motor 90 after the engine E has been started, the one way clutch 85 is brought to a decoupled position and the power transmission from the crankshaft 39 to the starter motor 90 is inhibited.

A first speed change gear 92, which has a reduced diameter, and a second speed change gear 94, which has a large diameter, are fixed to, for example, integrally formed with the countershaft 78. In the embodiment now under discussion, although the speed change gears are employed two in number, they may be employed in any number equal to or greater than three. The supercharger drive shaft 82 is provided with a third speed change gear 96, which has a large diameter, and a fourth speed change gear 98 which has a reduced diameter. The third speed change gear 96 and the fourth speed change gear 98 are meshed respectively with the first speed change gear 92 and the second speed change gear 94. The third and fourth speed change gears 96 and 98 are rotatable relative to the supercharger drive shaft 82 and relatively immovable in the axial direction.

A sprocket 100 is provided on a right side end portion of the supercharger drive shaft 82. This sprocket 100 has a chain 102 trained therearound. The chain 102 forms a power transmitting unit for transmitting the power of the combustion engine E to the supercharger 62. Via the chain 102, a rotational force of the crankshaft 39 is transmitted from the countershaft 78 and the supercharger drive shaft 82 to an input shaft 65 connected with the supercharger rotating shaft 64. It is, however, to be noted that the method of driving the supercharger 62 may not be necessarily limited to that described above. The chain 102 is disposed on the right side of the motorcycle body, which is the side opposite to the intake port 66 of the supercharger 62 with respect to the motorcycle widthwise direction. In the embodiment now under discussion, the countershaft 78 and the supercharger drive shaft 82 have been described and shown as directly connected with each other, but they may be indirectly connected with each other via, for example, an idle gear. The details of the supercharger 62 will be discussed later.

A shifter 104 is disposed at the supercharger drive shaft 82 and between the third speed change gear 96 and the fourth speed change gear 98. The shifter 104 includes a shift ring 105, a shifting fork 106 for maneuvering the shift ring 105, and a shift drum 108 for moving the shifting fork 106 in parallel to the supercharger drive shaft 82.

The shift ring 105 is splined to the supercharger drive shaft 82 and, accordingly, the shift ring 105 is axially movable along the supercharger drive shaft 82, but non-rotatable relative to the supercharger drive shaft 82. The shift drum 108 is rotationally driven by a shifter drive unit 110 to axially move the shifting fork 106. When one of dogs 96a and 98a, provided respectively in the third and fourth speed change gears 96 and 98, is selectively engaged in an engagement hole 105a defined in the shift ring 105, the shift ring 105 is selectively engaged relatively non-rotatably with one of the third and fourth speed change gears 96 and 98.

Via the selected speed change gear 96 or 98, the power is transmitted from the countershaft 78 to the supercharger drive shaft 82. In other words, when a dogged connection establishes between the shift ring 105 and the third speed change gear 96, the revolution of the countershaft 78, that is, the revolution of the crankshaft 39 is transmitted to the supercharger drive shaft 82 at a large speed increasing ratio. On the other hand, when a dogged connection establishes between the shifting fork 106 and the fourth speed change gear 98, the revolution of the countershaft 78 is transmitted to the supercharger drive shaft 82 at a small speed reducing ratio. The shifter derive unit 110 is of a type having, for example, a servomotor, but it is not necessarily limited thereto. Thus, the rotational power of the crankshaft 39 is transmitted from the countershaft 78 to the supercharger drive shaft 82 via the selected speed change gear 96 and 98.

The shifter drive unit 110 is operable to move the shifting fork 106 in the axial direction of the shift drum 108 in dependence on, for example, the number of revolutions of the combustion engine E so that one of the third and fourth speed change gears 96 and 98, which is appropriate for the number of revolutions, may be selected. More specifically, at a low rotating region of the combustion engine E, the dogged connection established between the shift ring 106 and the third speed change gear 96 to allow the speed increasing ratio of the supercharger 62 to increase so that the supercharge pressure, that is, the supercharged air amount can be increased to allow the engine torque to be gained at a low speed. On the other hand, at a high rotating region of the combustion engine E, setting is made in which the dogged connection established between the shift ring 105 and the fourth speed change gear 98 to allow the speed increasing ratio of the supercharger 62 to be lowered to thereby avoid an excessive increase of the supercharged air amount so that a proper engine torque and a stabilized revolution can be obtained.

Figure 6:
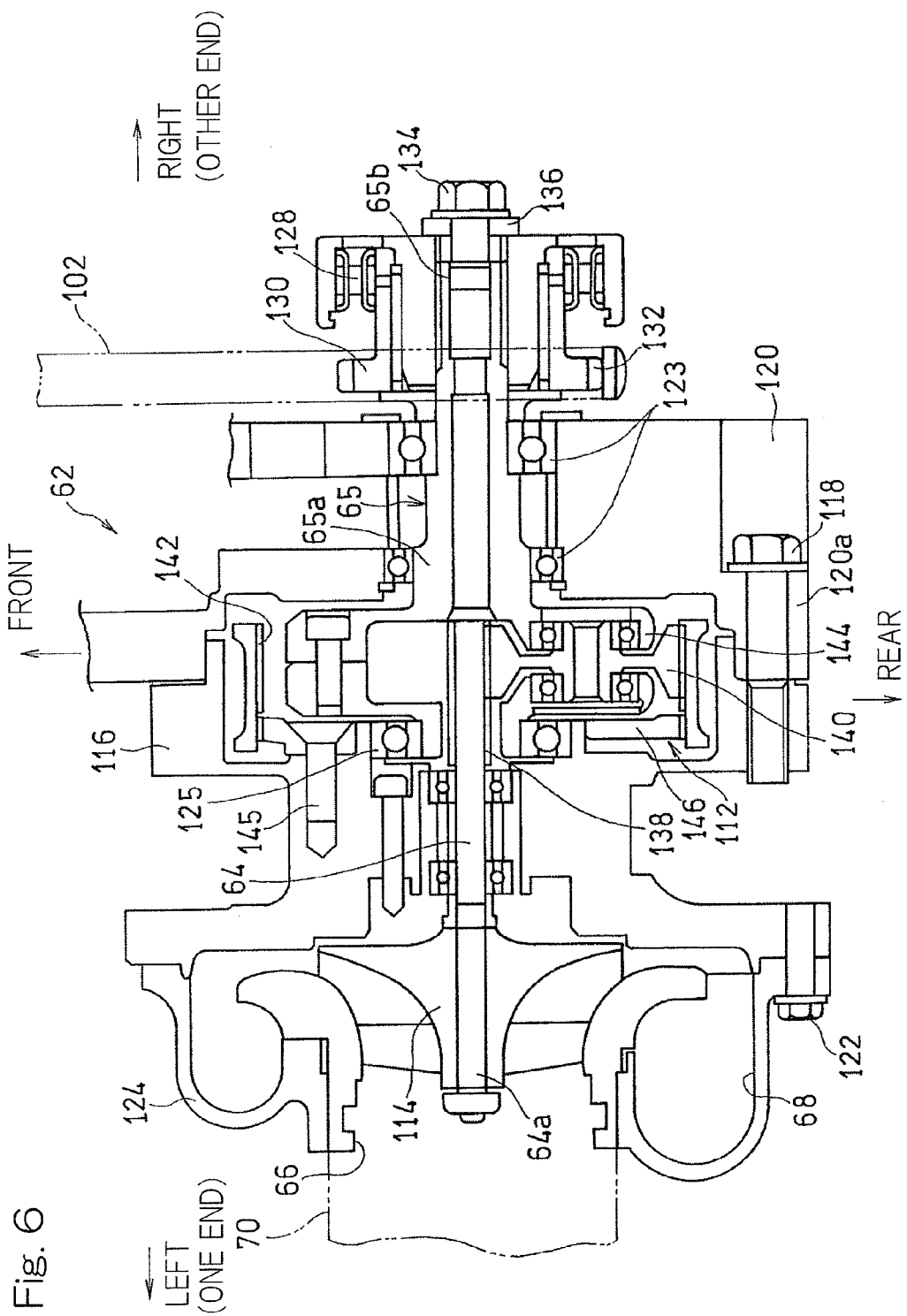
FIG. 6 is a schematic horizontal sectional view of the supercharger used in the power train.

FIG. 6 depicts a horizontal sectional diagram of the supercharger 62 referred to above. As shown in FIG. 5, the supercharger 62 includes a pressure supply unit 61 and a speed increasing unit 63. The pressure supply unit 61 in turn includes an impeller 114 fixed to one end portion 64a of the supercharger rotating shaft 64. The opposite end portion 64b of the supercharger rotating shaft 64 is connected with one end portion 65a (the left side end portion with respect to the motorcycle widthwise direction) of the input shaft 65 of the speed increasing unit 63 via a planetary gear device 112 which is a speed increaser or a set-up gear. In the description that follows, one end side of the supercharger 62 is referred to as the left side with respect to the motorcycle widthwise direction whereas the other end side is referred to as the right side with respect to the motorcycle widthwise direction. The speed increaser may not necessarily be used.

The supercharger rotating shaft 64 is rotatably supported by a housing 116. A casing 124 for enclosing the impeller 114 referred to above is fitted to a first flange 116a on one end side of the housing 116 with the use of a casing fastening member 122 such as, for example, bolts. A second flange 116b on the other end side of the housing 116 is fixed to a casing flange 120a of a fixture casing 120, which is supported by the crankcase 40 (best shown in FIG. 1) by means of a housing fastening member 118. Accordingly, the supercharger rotating shaft 64 and the impeller 114 are covered by the housing 116 and the casing 124. The casing 124 is formed with the suction port 66, open towards that one end side, and the discharge port 68 open upwardly.

The input shaft 65 is in the form of a hollow shaft, and is rotatably supported by the fixture casing 120 via bearings 123 at a portion thereof adjacent to the other end portion thereof and an intermediate portion. On the other hand, one end portion 65a of the input shaft 65 is rotatably supported by the housing 116 via a bearing 125. Spline serrations are formed on an outer peripheral surface of the other end portion 65b of the input shaft 65. Via a one way clutch 128 mounted on this outer peripheral surface by means of the spline engagement, a sprocket 130 is connected with the input shaft 65.

The chain 102 referred to previously is trained around teeth 132 of the sprocket 130, and the revolution of the supercharge drive shaft 82 (shown in FIG. 5) is transmitted to the input shaft 65 through this chain 102. Female threads are formed in an inner peripheral surface of the other end portion 65b of the input shaft 65. The one way clutch 128 is mounted on the other end portion 65b via a washer 136 by means of a head portion of a bolt 134 threadingly engaged with the female threads.

As hereinabove described, the planetary gear device 112 is disposed between the input shaft 65 and the supercharger rotating shaft 64, and is supported by both of the housing 116 and the casing 120. External threads 138 are formed on the other end portion 64b of the supercharger rotating shaft 64, and a plurality of planetary gears 140 are meshed with those external threads while having been arranged in a circumferential direction. In other words, the external threads 138 formed on the supercharger rotating shaft 64 function as a sun gear of the planetary gear device 112.

Also, the planetary gear 140 is meshed with an internal gear (ring gear) 142 of a large diameter on a radially outer side. Each of the planetary gears 140 is rotatably supported by a respective carrier shaft 144 by means of a bearing 143. The bearing 143 is mounted on an annular flange portion 144 at the one end portion 65a of the input shaft 65. Accordingly, when the input shaft 65 is rotated, the planetary gears 140 undergo a revolution around the supercharger rotating shaft 64. In other words, the input shaft 65 rotates together with the carrier shafts 144 of the planetary gear device 112.

The internal gear 142 is connected with a fixture member 146, and this fixture member 146 is secured to the housing 116 by means of a bolt 145. In other words, the internal gear 142 is fixed. As such, the internal gear 142 is fixed, the carrier shaft 144 is connected with the input shaft 65 for rotation together therewith, and the sun gear (external gear 138) is formed in the supercharger rotating shaft 64 which serves as an output shaft. The planetary gear device 112 serves to increase the speed of rotation of the input shaft 65 and transmits it to the supercharger rotating shaft 64 at a positive rotation, that is, in the same direction of rotation as that of the input shaft 65.

The structure of the supercharger 62 is not necessarily limited to that shown and described in connection with the embodiment now under discussion.

By way of example, the orientation of the axis of the supercharger rotating shaft 64 may differ from that of the engine rotary shaft 39 (best shown in FIG. 5). Also, the supercharger 62 may be of a type that does not utilize the power from the combustion engine and may be of a type utilizing an electrically operated motor or the power from exhaust gases. Even in the internal structure of the supercharger 62, it may be anything other than the impeller, such as, for example, a gear pump. In addition, the speed increasing mechanism may not be necessarily limited to that shown and described in connection with the embodiment now under discussion and the planetary gear device 112 may be dispensed with.

The details of the air intake duct 70, shown in FIG. 1, will now be described. The air intake duct 70 is disposed on the left side, which is one side of the combustion engine E, and includes a ram duct unit 147 on an upstream side and an air intake duct portion 148 on a downstream side. The ram duct unit 147 is supported by the main frame 1 with its front end opening 147a facing the air intake opening 38 in the previously described cowling 34, and serves to increase the pressure of the air introduced from the opening 147a under the ram effect. The air intake duct portion 148 has a front end portion 148a fluid connected with a rear end portion 147b of the ram duct unit 147. A rear end portion 148b of the air intake duct portion 148 is fluidly connected with the intake port 66 of the supercharger 62.

The front end opening 147a of the air intake duct 70 is held at a position higher in level than the upper surface of the crankcase 40. More specifically, the front end opening 147a is held at a position higher in level than the cylinder block 44 and the intake port 66 of the supercharger 62. This front end opening 147a is also positioned forwardly of a rear end of the front wheel 10 and above an upper end of the front wheel 10. Also, the front end opening 147a is positioned forwardly of the radiator 27 and the front fork 8.

As shown in FIG. 2, the air intake duct portion 148 has an inner side face 148d, which is smoothly curved, at a location forwardly of the air intake port 66 of the supercharger 62, in a direction inwardly of the motorcycle widthwise direction towards the rear. Since the inner side face 148d of the air intake duct 70 is gradually varied inwardly towards the rear, it is possible to avoid a detachment of the flow of the intake air within the air intake duct 70. In the illustrated embodiment, an outer side face 148e of the air intake duct portion 148 is also curved. In other words, respective outermost portions of the inner side face 148d and the outer side face 148e of the air intake duct portion 148 are positioned forwardly of the air intake port 66 of the supercharger 62.

More specifically, the air intake duct portion 148 is so curved that the axis line 148c thereof may depict an arcuate shape. It is, however, to be noted that the air intake duct portion 148 works satisfactorily if smoothly curved and the axis line 148c may not necessarily follow the arcuate shape. The radius r of curvature of the axis line 148c of the air intake duct portion 148 is greater than the diameter D of the air intake duct 148 (that is, r>D), and is preferably twice or more of the diameter D (r≥2D) and, more preferably, three or more of the diameter (r≥3D). The center O of curvature is positioned inwardly of the outer side surface of the combustion engine E.

The curvature start position SP is positioned at a distance equal to or greater than the diameter D of the intake duct portion 148 forwardly of the air intake port 66 of the supercharger 62 and, specifically, rearwardly of the cylinder head 42. Thus, when the curvature starts from rearwardly of the cylinder head 42 that is positioned on the outermost side of the motorcycle body, the radius r of curvature of the curved portion of the air intake duct 70 can be increased while the interference between the air intake duct 70 and the combustion engine E is avoided.

In the saddle riding type vehicle such as, for example, the motorcycle, since the motorcycle widthwise dimension is small, it is difficult to increase the radius r of curvature, when viewed from top. However, as described above, positioning the curvature start position SP at a location forwardly of the air intake port 66 of the supercharger 62 is effective to permit the radius r of curvature to be increased.

The ram duct unit 147 shown in FIG. 1 is generally positioned forwardly of the head pipe 4 and is integrally fixed with, for example, the cowling 34 and the headlamp unit 36. It is to be noted that the inside of the head pipe 4 may be used as a part of the air intake passage in the ram duct unit 147.

The front end opening 147a of the ram duct unit 147 serves as an introducing port 70a of the air intake duct 70. The introducing port 70a of the air intake duct 70 is disposed in the vicinity of a front end portion, which is positioned most forwardly of a center portion of the cowling 34 with respect to the motorcycle widthwise direction, that is, in the vicinity of the point P of stagnation. Accordingly, the incoming wind A having a high pressure can be introduced into the cylinder. It is, however, to be noted that the introducing port 70a of the air intake duct 70 may be formed at any location other than the point P of stagnation.

A high order portion 70b, which is positioned above the introducing port 70a of a front end, is formed in an intermediate portion of the air intake duct 70, for example, an intermediate portion of the ram duct unit 147 in the illustrated embodiment. In the illustrated embodiment, the high order portion 70b is provided in the ram duct unit 147 at a location forwardly of the head pipe 4 and rearward of the headlamp unit 36. The high order portion 70b has an air cleaner 150 built therein. The air cleaner 150 purifies the air to be introduced into the supercharger 62. As described above, when the air cleaner 150 is disposed in the high order portion 70b, it is possible to avoid an undesirable ingress of water into the air cleaner 150.

In the embodiment now under discussion, the air intake duct 70 passes outside of a region of rotation of the front fork 8. Accordingly, the air intake duct 70 does not interfere with the front fork 8. Also, the air intake duct 70 passes above the radiator 27. Accordingly, the air intake duct 70 will not hamper the flow of the incoming wind A, which has passed the radiator 27, towards the side of the motorcycle body. As a result, the cooling performance of the radiator 27 can be maintained. It is, however, to be noted that the air intake duct 70 may pass outside of the radiator 27. Even in that case, it is preferred that the air intake duct 70 may be arranged so that it will not hamper the flow of the incoming wind A, which has passed the radiator 27.

The air intake duct portion 148 is a portion positioned rearwardly of the head pipe 4. This air intake duct portion 148 is used to smoothly connect between the ram duct unit 147 and the supercharger 62, and is defined by, for example, a tubular body made of a resinous material. The air intake duct portion 148 is smoothly inclined downwards from the ram duct unit 147 toward the rearward, and passes a lateral region of the cylinder head 44 and the head covering 46 at a location laterally of the cylinder block 42.

More specifically, a portion of the air intake duct 70 that passes a space laterally of the cylinder block 42 has a lower end positioned downwardly of an upper end 44a of the cylinder head 44 and also downwardly of an upper end 42a of the cylinder block 42. In other words, when viewed from side, a portion of the air intake duct 70 and the combustion engine E overlap one above the other. An upper end of that portion passing the space laterally of the cylinder block 42 may be so made as to assume a position below the head covering 46 or the cylinder head 44.

The incoming wind A from the air intake opening 38 passes through the ram duct unit 147 and is, after having been purified by the air cleaner 150, introduced into the supercharger 62 via the air intake duct portion 148. The incoming wind A so introduced into the supercharger 62 is pressurized by the supercharger 62, and is then introduced into the cylinder via the intake air chamber 74 and the throttle body 76.

The air intake duct portion 148 shown in FIG. 2 includes a first duct portion 152 and a second duct portion 154. The first duct portion 152 is inclined downwardly rearwardly from the ram duct unit 147 and is also bulged leftwards (outside). This first duct portion 152 also passes a space on the lateral left side of the cylinder block 42 and downwardly of the upper end of the cylinder head 44 before it extends in a direction conforming to the longitudinal sense of the motorcycle body. The second duct portion 154 is continued to a rear end of the first duct portion 152, then curved towards a center portion of the motorcycle widthwise direction and finally connected with the intake port 66 of the supercharger 62 at a location rearwardly of the cylinder block 42.

As shown in FIG. 1, the first duct portion 152 of the air intake duct portion 148, when in the lateral region of the combustion engine E, passes above the crankshaft 39 when viewed from side. Specifically, the first duct portion 152 passes above an upper surface of the generator covering 58, which is fitted to a left side portion of the crankcase 40, and below the upper surface of the cylinder head 44 and the throttle body 76. More specifically, the lower surface of the air intake duct portion 148 passes above the upper surface of the generator covering 58 and also above the crankshaft 39. Also, the lateral region of the combustion engine E in the first duct portion 152 and a downstream portion positioned downstream thereof, when viewed from side, passes below the intake air chamber 74 at a height substantially level with the second duct portion 154.

As hereinabove described, the first duct portion 152 of the air intake duct portion 148, in the engine lateral region, extends beneath the upper surface of the cylinder head 44, and the second duct portion 154 is disposed below the upper surface of the cylinder head 44. Accordingly, as compared with the case in which the duct passes above the upper surface of the cylinder head 44, there is no need to drastically bend the air intake duct portion 148 downwardly in order for it to be connected with the air intake opening 66 and, therefore, it is possible to secure a large radius of curvature of the air intake duct portion 148.

Also, since in the lateral region of the combustion engine E, the air intake duct portion 148 pass below the throttle body 76, interference component parts such as, for example, with a throttle valve drive mechanism, a sensor or the like which is formed on both side portions of the throttle body 76 is avoided to allow the air intake duct portion 148 to be extended in the direction inwardly of the motorcycle widthwise direction as far as possible.

Figure 7:
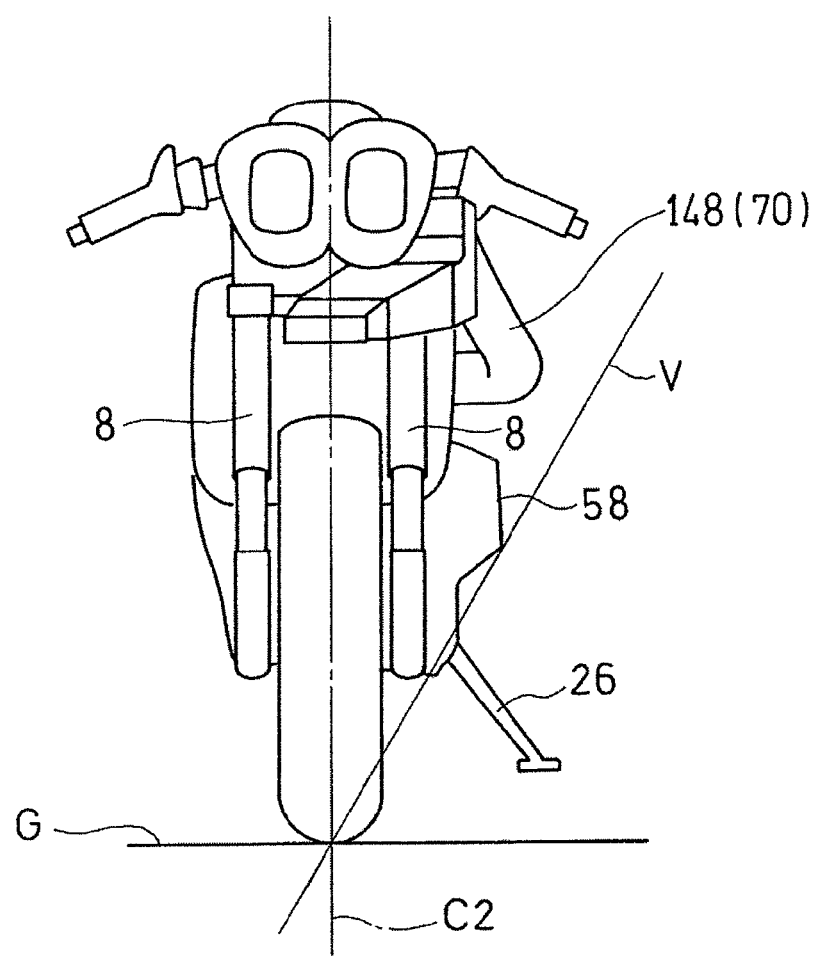
FIG. 7 is a schematic front elevational view of the motorcycle.

In addition, since the first duct portion 152 extends above the generator covering 58, interference between the air intake duct portion 148 and the generator covering 58 can be avoided. Also, at the time of tumble of the motorcycle the generator covering 58 is first brought into collision against the road surface prior to the collision of the air intake duct portion 148 and, accordingly, the collision of the air intake duct portion 148 against the road surface can be relieved and, hence, impairment of the air intake duct 148 can be suppressed. In other words, as shown in FIG. 7, the air intake duct portion 148 is preferably disposed inwardly of the imaginary line V (bank angle) extending from the point of intersect between the road surface G and the mid-center plane C2, which passes through a motorcycle body center in the motorcycle widthwise direction, to the outermost side surface of the combustion engine E.

In the illustrated embodiment, the sectional shape of the first duct portion 152 of the air intake duct portion 148 has been shown and described as a round sectional shape, but it may be other than the round sectional shape, such as, for example, a sectional shape in which a major axis extends in the up and down direction (vertical direction), specifically, an oval sectional shape or a D-sectioned shape (a shape in which opposite ends of the arch are connected together). Specifically, when as the duct sectional shape in the lateral region of the combustion engine E, the dimension in the up and down direction that is greater than that in the motorcycle widthwise direction is employed, it is possible to increase the passage surface area while avoiding an undesirable expansion in the motorcycle widthwise direction.

Also, as shown in FIG. 2, the air intake duct 70 is disposed on the left side which is opposite to the side where the clutch 48 is disposed and which is the same side as that of the drive chain (transmitting mechanism) 24 and the kickstand 26. Positioning on the same side as that of the kickstand 26 makes it possible for the air intake duct 70 to be less visible at the time of halt of the motorcycle. Also, although the valve driving force transmitting mechanism 60 comes to be disposed on the right side, the right side position can be made higher than the left side during the halt of the motorcycle, and therefore, oil within the cylinder head 44 can be prevented from leaking into a right side passage where the valve driving force transmitting mechanism 60 is accommodated.

It is, however, to be noted that the air intake duct 70 may be disposed on the same side as the valve driving force transmitting mechanism 60. By way of example, where the intermediate position of the cylinder block 42 in the motorcycle widthwise direction is offset on one side of the widthwise direction relative to the longitudinal center line C of the motorcycle body, a space is available on the other side of the cylinder block 42 and, therefore, the air intake duct 70 may pass through the space formed on the other side of the cylinder block 42. Also, by designing the shape of the air intake duct 70 and/or applying a decorative paint to allow the air intake duct 70 to be disposed on the opposite side of the kickstand 26, the air intake duct 70 can be formed as an ornamental item that is more visible during the halt of the motorcycle.

Also, the second duct portion 154 is formed with an air reserving portion 156 positioned rearwardly of the cylinder block 42 and having a flow passage surface area that is set to a larger value than that of the first duct portion 152. Thus, formation of the air reservoir 156 which is a diametrically enlarged portion is effective to reduce the air sucking speed to increase the air intake efficiency. Also, the provision of the air reservoir 156 makes it possible to reduce the sectional surface area of the air intake duct portion 148 other than the diametrically enlarged portion down to a value smaller than the air intake port 66 of the supercharger 62. However, the use of the air reservoir 156 may be dispensed with.

When the crankshaft 39 shown in FIG. 5 rotates, the countershaft 78 rotates in association with the crankshaft 39 due to the meshed relation between the drive gear 84 and the crank gear 80. When the countershaft 78 rotates in the manner described above, the supercharger drive shaft 82 is rotated through the transmission device. The rotation of the supercharger drive shaft 82 results in rotation of the input shaft 65 via the chain 102 and, also, rotation of the supercharger rotating shaft 64 allows the supercharger 62 to be started.

When the motorcycle runs, the incoming wind A shown in FIG. 1 passes from the air intake opening 38 and then through the ram duct unit 147 and is subsequently introduced into the supercharger 62 after having been purified by the air cleaner 150. The incoming wind A so introduced into the supercharger 62 is pressurized by the supercharge 62 and is then introduced into the combustion engine E via the intake air chamber 74 and the throttle body 76. By such a cumulative effect of the ram pressure and the pressurization of the supercharger 62, the high pressure intake air can be supplied to the combustion engine E.

In the construction hereinabove described, since the air intake duct 70 extends from forwardly of the combustion engine E towards the rear thereof so as to pass on the left side of the combustion engine E, the possibility of the space above the combustion engine E being reduced by the air intake duct 70 can be avoided. As a result thereof, the fuel tank 28 disposed above the combustion engine E can have an increased capacity and, also, the degree of freedom in designing can be increased. Also, positioning of the intake air chamber 74 upwardly of the combustion engine E allows the fuel tank 28 to secure a sufficient capacity.

As shown in FIG. 2, since the inner side face 148d of the air intake duct 70 is curved at the location forwardly of the air intake port 66 of the supercharger 62, a smoothly curved path can be easily formed and the line resistance in the air intake passage can be reduced. When the supercharger 62 is used, the flow speed of the intake air flowing in the air intake duct 70 becomes extremely high and the passage resistance will increase. However, since as described above the passage resistance can be reduced, the reduction of the engine output can be suppressed even where the supercharger 62 is used.

Since the valve driving force transmitting mechanism 60 is disposed laterally rightwardly of the combustion engine E and the air intake duct 70 passes in the space left vacant on the left side, the space around the combustion engine E can be efficiently utilized.

As shown in FIG. 1, the supercharger 62 is disposed above the crankcase 40 and the air intake duct 70 passes the lateral region of the combustion engine E at a location below the cylinder head 44. Accordingly, when viewed from the side, the first duct portion 152 of the air intake duct 70 can be fluidly connected with the supercharger 62 without the first duct portion 152 being markedly curved in the up and down direction at a location rearwardly of the cylinder head 44.

As shown in FIG. 2, the air intake port 66 of the supercharger 62 is disposed inwardly of the left side surface of the combustion engine E with respect to the motorcycle widthwise direction, and the second duct portion 154 of the air intake duct 70 is formed with the air reserving portion 156. Therefore, the high pressure air can be provided before the air intake port 66 of the supercharger 62 and, accordingly, the output of the combustion engine E can be increased. Although the channel surface area of the second duct portion 154 extending in a direction conforming to the motorcycle widthwise direction is increased, the dimension in the motorcycle widthwise direction does not increase, and therefore, the air reserving portion 156 can be accommodated within the width of the combustion engine E.

As shown in FIG. 5, the chain 102 for transmitting the power of the combustion engine E to the supercharger 62 is disposed on the right side with respect to the motorcycle widthwise direction, which is opposite to the left side in which the air intake port 66 of the supercharger 62 is oriented. Accordingly, the space around the combustion engine E can be further efficiently utilized with no interference occurring between the air intake duct 70, which is fluidly connected with the air intake port 66, and the chain 102.

As shown in FIG. 1, the air intake port 66 of the supercharger 62 is positioned at a location upwardly of the rear portion of the crankcase 40, that is, at a location spaced a substantial distance rearwardly from the cylinder block 42. Also, the intake air chamber 74 is disposed substantially or generally intermediate between the supercharger 62 and the air intake port 72 of the combustion engine E in a direction conforming to the forward and rearward direction. Moreover, the second duct portion 154 of the air intake duct 70, which is positioned in the lateral region of the combustion engine E and downstream thereof, extends below the intake air chamber 74. As a result, the air intake port 66 of the supercharger 62 shown in FIG. 2 is positioned a large distance rearwardly away from the cylinder block 42. Accordingly, after the passage laterally of the combustion engine E, the air intake duct 70 can be curved to have a relatively large radius of curvature.

In addition, positioning of the air intake port 66 rearwardly makes it possible to allow the supercharger 62 in its entirety, including the discharge port 68, to be disposed rearwardly. Accordingly, the dimension of the intake air chamber 74, shown in FIG. 1, in the forward and rearward direction can be increased to allow the chamber capacity to be reduced without increasing the V' 25 dimension of the intake air chamber 74 in the up and down direction. Suppression of the dimension of the intake air chamber 74 in the up and down direction makes it possible to avoid any interference between the intake air chamber 74 and the second duct portion 154 which passes below the intake air chamber 74. As a result, the possibility of the space above the combustion engine E being reduced can be further avoided.

As shown in FIG. 1, the high order portion 70b positioned upwardly of the introducing port 70a of the front end of the air intake duct 70 is formed in the intermediate portion of the air intake duct 70 in the forward and rearward direction. Accordingly, an undesirable ingress of water entering the introducing port 70a together with the incoming wind A into the supercharger 62 can be suppressed.

Also, the introducing port 70a of the air intake duct 70 is held at a heightwise position substantially level with the air intake port 66 of the supercharger 62. Accordingly, the introducing port 70a of the air intake duct 70 gets away from the road surface and, therefore, an undesirable ingress of, for example, rainwater and/or muddy water from the introducing port 70a can be suppressed.

As a modified form of the previously described first embodiment of the present invention, arrangement may be made that the supercharger 62 be dispensed with and a downstream end portion of the air intake duct 70 is fluidly connected with the intake air chamber 74 either directly or via a deflecting member such as, for example, a funnel. In such case, the intake air chamber 74 forms an air intake portion from which the intake air is supplied to the combustion engine E. Even such a modified form can exhibit effects similar to those afforded by the previously described first embodiment of the present invention. In other words, since no air intake duct 70 is disposed in the space above the combustion engine E, the degree of freedom in designing can be increased. Also, in the previously described first embodiment, at the site where the supercharger 62 is disposed, any other component such as, for example, the intake air chamber 74 and the air cleaner 150 can be disposed and the degree of freedom in disposing the components is further increased.

Figure 8:
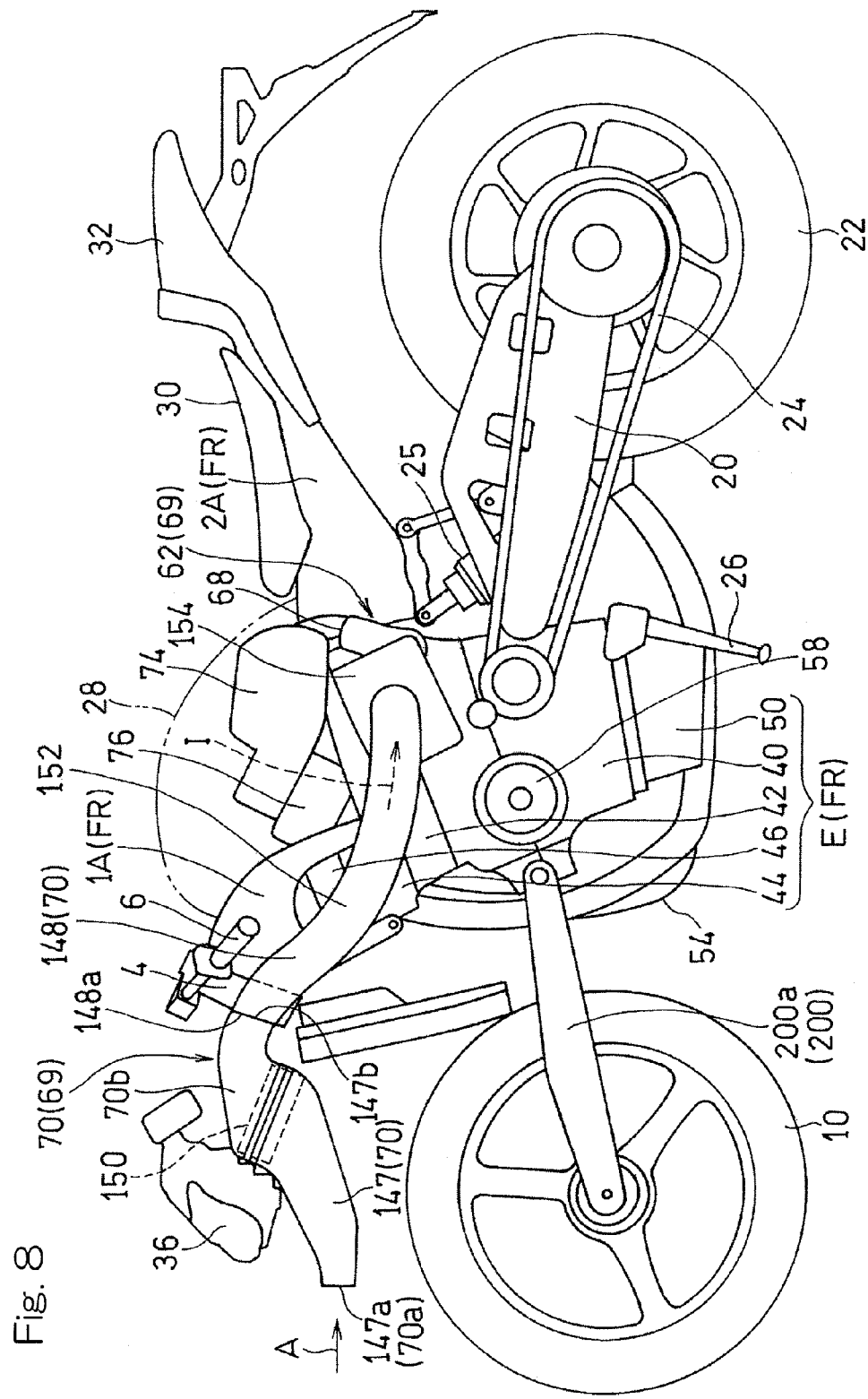
FIG. 8 is a view similar to FIG. 1, showing the motorcycle having mounted thereon the combustion engine designed in accordance with a second preferred embodiment of the present invention.

FIG. 8 illustrates a side view of the motorcycle having mounted thereon a combustion engine designed in accordance with a second preferred embodiment of the present invention. The motorcycle frame structure FR of this motorcycle includes a combustion engine E disposed at the intermediate portion of the motorcycle body, a front frame 1A supported by the combustion engine E and extending diagonally upwardly and forwardly from the combustion engine E in the vicinity of the center with respect to the motorcycle widthwise direction, and a rear frame 2A supported by the combustion engine E and extending diagonally upwardly and rearwardly from the combustion engine. In other words, the combustion engine E forms a part of the motorcycle frame structure FR.

The head pipe 4 is formed integrally with a front end of the front frame 1A, with the steering shaft (not shown) being rotatably supported by this head pipe 4, and the steering handlebar 6 is fixed to this steering shaft. In other words, the head pipe 4 functions as a handlebar post, and the front frame 1A, which is a part of the motorcycle frame structure FR, extends from the head pipe 4 in a direction rearwardly of the motorcycle body. It is to be noted that in FIG. 8, the cowling 34 is not shown.

Forked arms 200 extending forwardly from the combustion engine E are supported by a front portion of the crankcase 40 of the combustion engine E for movement up and down, and a hub steering mechanism (not shown) for steerably supporting the front wheel 10 is fitted to left and right pairs of arm pieces 200a and 200a of the arms 200. Also, there are provided a steering mechanism (not shown) for steering the front wheel 10 by means of the hub steering mechanism by transmitting the manipulation of the hub steering mechanism and a front suspension (not shown) for cushioning a load imposed on the front wheel 10. Other structural features than those described above are similar to those afforded by the previously described embodiment and, therefore, effects similar to those afforded by the previously described embodiment can be obtained.

Also, the motorcycle according to the second embodiment is such that the combustion engine E forms a part of the motorcycle frame structure FR and, therefore, makes no use of the motorcycle frame structure FR on an outer side of the cylinder block 42. Accordingly, the interference between the motorcycle frame structure FR and the air intake duct 70 is avoided, and the air intake duct 70 can be easily disposed laterally of the combustion engine E. Also, with the combustion engine E rendered to be a part of the motorcycle frame structure FR, there is no need to increase the rigidity of the frame that extends rearwardly from the head pipe 4 and, therefore, the degree of freedom of the air intake duct 70 can be further increased.

The air intake duct 70 of the present invention can have one of other various shapes than that described hereinbefore in connection of the foregoing embodiment. By way of example, although in the foregoing embodiment the passage surface area of the air intake duct portion 148 of the air intake duct 70 remains constant, arrangement may be made to gradually decrease the passage surface area in a direction from front towards rear. Accordingly, the flow velocity of the intake air gradually increase from the upstream side towards the downstream side. As a result, without the flow velocity of the intake air being lowered in the vicinity of an air intake port 66 of the supercharger 62, the high efficiency of the supercharger 62 can be secured. Also, since the flow velocity of the intake air gradually increases, the turbulence of the flow is minimized and the air intake efficiency is high.

Figure 9:
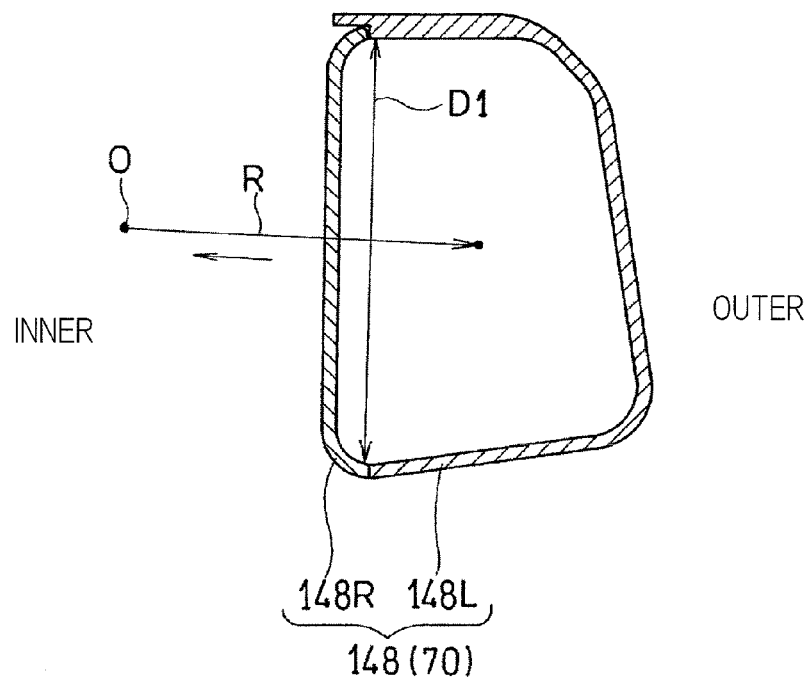
FIG. 9 is a schematic longitudinal sectional view showing a first modified form of an intake duct used in the combustion engine of the present invention.

Also, although in the foregoing embodiment the air intake duct portion 148 of the air intake duct 70 has been shown and described as having the round transverse sectional shape, the curved portion may have such a sectional shape that, as shown in FIG. 9, the dimension D1 in a direction conforming to the transverse direction perpendicular to the radial direction R may gradually decrease from the center (center of curvature) O of the curvature towards the outside of the radial direction of the curvature. According to this construction, the passage radially outwardly of the curvature within the inside of the air intake duct 70 will become narrow as compared with the passage radially inwardly of the curvature. Accordingly, the bias of the intake air in a direction outwardly of the radial direction R of the curvature by the effect of the centrifugal force is suppressed, and the flow of the intake air is uniformized within the air intake duct 70. With the uniformized flow of the intake air being introduced into the air intake port 66 of the supercharger 62, an undesirable reduction in efficiency of the supercharger 62 can be avoided.

Yet, as shown in FIG. 9, the air intake duct portion 148 of the air intake duct 70 may be of a leftwardly and rightwardly split construction comprised of a left side half 148L and a right side half 148R. With this construction, the air intake duct 70 can be formed by means of a mold shaping. As a result, even when curvature is made not only in the up and down direction, but also in a leftward and rightward direction, the air intake duct 70 can be easily formed.

Figure 10:
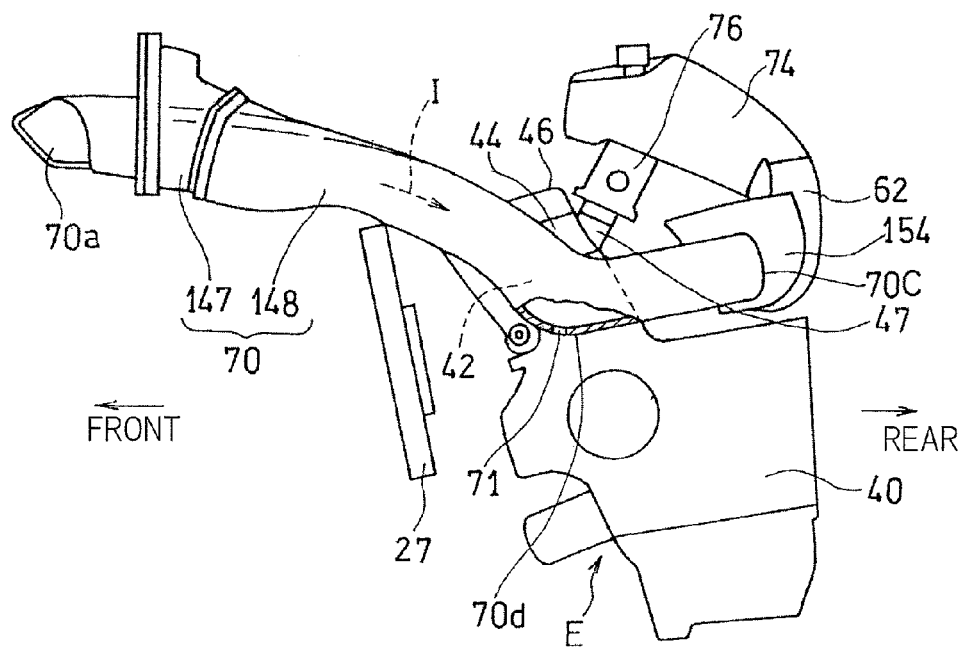
FIG. 10 is a schematic side view showing a second modified form of the intake duct used in the combustion engine of the present invention.

Also, as shown in FIG. 10, the undersurface of the air intake duct 70 may have a lowermost portion 70d at an intermediate portion between the introducing port 70a at the front end and a rear end portion 70c, and a drain hole 71 may be provided so as to extend completely through a duct wall of the lowermost portion 70d. Accordingly, even when rainwater ingresses into the air intake duct 70, the rainwater can be discharged from the drain hole 71 before it reaches the air intake port 66 of the supercharger 62 and, thus, the ingress of the rainwater into the supercharger 62 is avoided.

In the example shown in FIG. 10, the air intake duct 70 has an upper surface of such a shape as to follow the undersurface. In other words, even the upper surface of the air intake duct 70 has the lowermost portion at the intermediate portion between the introducing port 70a at the front end and the rear end portion 70c, and the air intake duct 70 as a whole has an V shaped configuration when viewed from side. Accordingly, an abrupt change of the passage surface area within the air intake duct 70 is suppressed.

Figure 11:
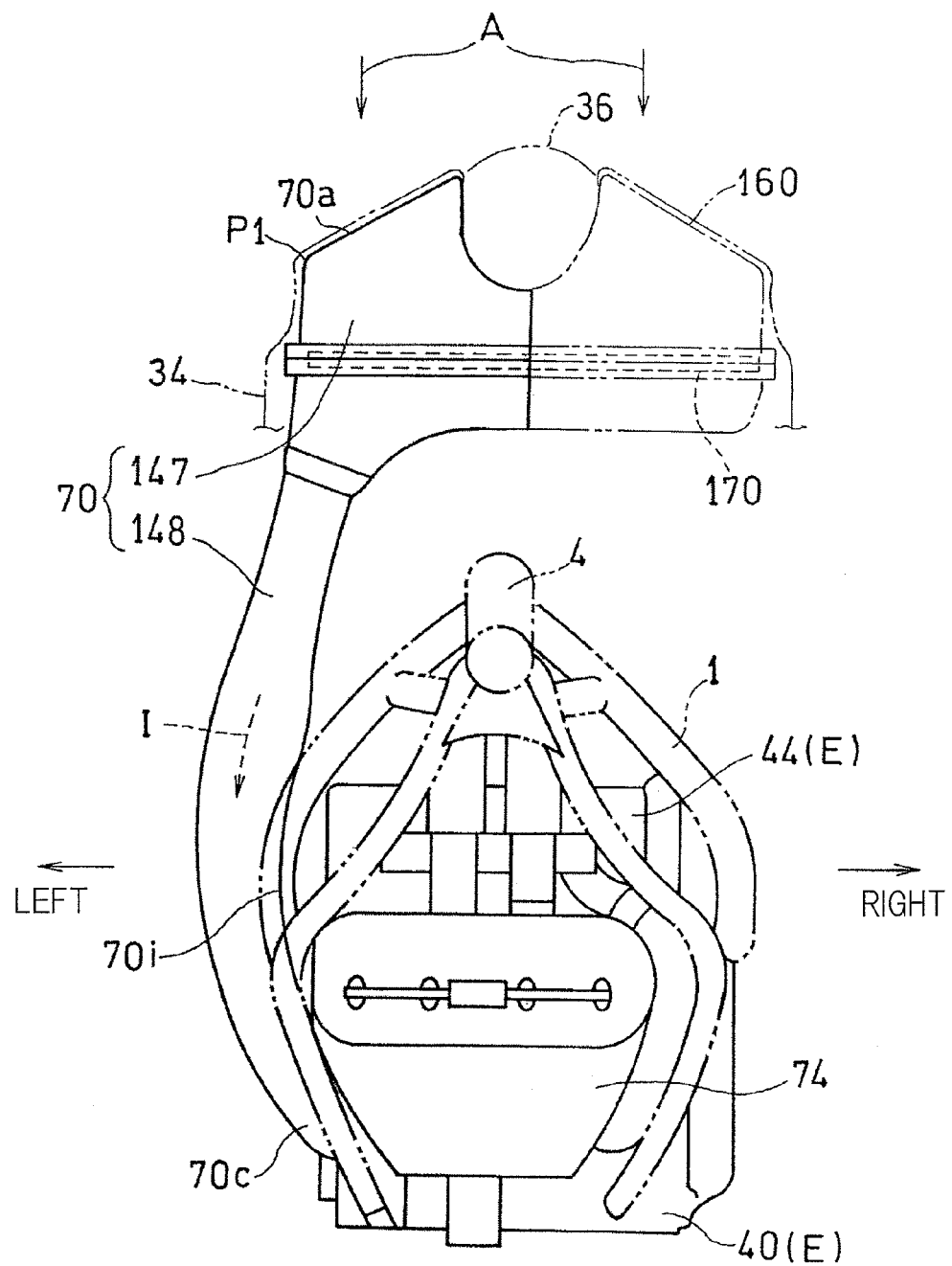
FIG. 11 is a schematic top plan view showing a third modified form of the intake duct used in the combustion engine of the present invention.

Yet, as shown in FIG. 11, the headlight unit 36 may be disposed at an intermediate portion of the motorcycle body with respect to the motorcycle widthwise direction, in which case the introducing port 70a and the air intake duct 70 are disposed on the outer side (left side so far shown in FIG. 11) of the headlight unit 36. In FIG. 11, an outer side end P1 of the introducing port 70a is shown as positioned on an outer side of an inner side face 70i of the air intake duct 70 over the entire area in the forward and rearward direction. Also, the introducing port 70a has an open edge inclined outwardly towards the rear.

In addition, as shown by the double dotted chain line in FIG. 11, the air intake duct 70 may have an additional introducing port 160 besides a left side introducing port 70a. According to this construction, because of the presence of the additional introducing port 160, the amount of the incoming air A sucked increases. In such case, a cleaner element 170 having, for example, a large passage surface area may be built therein at the junction between the ram duct unit 147 and the air intake duct portion 148. Accordingly, the intake air I passes the cleaner element 170 at a site where the flow velocity is low and, therefore, the flow loss at the time of passage through the cleaner element 170 can be minimized.

Although in describing each of the foregoing embodiments, the supercharger 62 or the intake air chamber 74 forms the air intake portion, it is not necessarily limited thereto and any other element such as, for example, the air cleaner or an introducing pipe of the throttle body 76 may be rendered as the air intake portion.

Also, beside each of the embodiments hereinabove fully described, the present invention is applicable to the standard structure in which the combustion engine E is not used as a part of the motorcycle frame structure, for example, the structure in which the motorcycle frame structure extends from the handlebar post towards the rear of the motorcycle body on the inner side of the air intake duct 70 with respect to the motorcycle widthwise direction, that is, the structure in which the frame extends above or below the combustion engine E. Specifically, the present invention is applicable to a cradle frame, a diamond frame or a backbone frame. In addition, it may be a twin tube frame, in which the motorcycle frame structure is disposed laterally of the combustion engine E. In such case, it is preferred to configure the structure in which arrangement is made to permit the incoming wind A to flow within the motorcycle frame structure so as to enable the air intake duct and the motorcycle frame to be concurrently served.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. By way of example, while in the foregoing embodiment of the present invention the air intake duct 70 has been shown and described as passing on the left side of the combustion engine E, the air intake duct 70 may pass on the right side of the combustion engine E or on both of the left and right sides of the combustion engine E. While the direction of rotation of the impeller 114 may change depending on whether the air intake duct 70 passes on the left side of the combustion engine E or whether the air intake duct 70 passes on the right side of the combustion engine E, it can be accommodated with no need to considerably change the supercharger 62, if the arrangement of the gears in the planetary gear device 112 is altered. Also, in place of the alteration of the arrangement of the gears of the planetary gear device 112, the direction of rotation of the impeller 114 may be changed by interposing an idle gear and/or altering the power transmitting path.

Also, although in the foregoing embodiment the air cleaner 150 has been shown and described as positioned in the vicinity of the head pipe 4, the air reserving portion 156 rearwardly of the cylinder block 42 may be used as an air cleaner chamber. Accordingly, the degree of freedom in designing increases further. Also, the duct structure of the present invention may be applied to any other saddle riding type vehicle other than the motorcycle and, specifically applied to a three wheeled automobile or a four wheeled automobile.

Accordingly, such changes and modifications are, unless they depart from the scope of the present invention as delivered from the claims annexed hereto, to be construed as included therein.

REFERENCE NUMERALS

4 . . . Head pipe (Handle post)
39 . . . Crankshaft (Engine rotary shaft)
40 . . . Crankcase
42 . . . Cylinder block
44 . . . Cylinder head
60 . . . Valve driving force transmitting mechanism
62 . . . Supercharger (Air intake portion)
66 . . . Air intake port
68 . . . Discharge port
69 . . . Supercharger device
70 . . . Intake air duct
70a . . . Introducing port
70b . . . High order portion
72 . . . Inlet port
74 . . . Intake air chamber
102 . . . Power transmitting unit
152 . . . First duct portion
154 . . . Second duct portion
156 . . . Air reserving portion
E . . . Combustion engine
FR . . . Motorcycle frame structure

What is claimed is:

1. An air intake structure for a vehicle including an engine having an engine rotary shaft extending in a widthwise direction of a vehicle body, the engine comprises:
   a crankcase to support the engine rotary shaft;
   a cylinder block to protrude upwardly from the crankcase;
   a cylinder head mounted on the cylinder block;
   a supercharger disposed rearwardly of the cylinder block and operable to supply an intake air to the engine under pressure; and
   an air intake duct, with a front end opening, fluidly connected with an air intake port of the supercharger and operable to guide an incoming wind, which flows forwardly of the engine, towards the supercharger; in which
   the air intake port is positioned below an upper end of the cylinder head;
   the air intake duct passes across a lateral space of the cylinder block and below the cylinder head;
   the air intake duct has an inner side surface with respect to the widthwise direction, the inner side face being curved at a position forwardly of the air intake port of the supercharger in a direction inwardly of the vehicle widthwise direction towards a rear; and
   the supercharger includes a centrifugal impeller and the air intake port of the supercharger opens on one side in the widthwise direction.

2. The air intake structure for vehicle as claimed in claim 1, wherein a discharge port of the supercharger opens upwardly.

3. The air intake structure for vehicle as claimed in claim 1, wherein the supercharger is positioned above the crankcase.

4. The air intake structure for a vehicle as claimed in claim 1, further comprising a power transmitting unit to transmit a power of the engine to the supercharger, the power transmitting unit being disposed on one side opposite to the air intake port of the supercharger with respect to the vehicle widthwise direction.

5. The air intake structure for a vehicle as claimed in claim 1, wherein the air intake port of the supercharger is positioned above a rear portion of the crankcase,
   wherein an intake air chamber is disposed between a discharge port of the supercharger and an air intake port of the engine in a direction conforming to a forward and rearward direction,
   wherein the intake air is introduced into the air intake port of the engine after having flown from the supercharger and then through the intake air chamber, and
   wherein a downstream portion of the air intake duct extends below the intake air chamber, which downstream portion is positioned at the lateral region of the cylinder block and at its downstream side.

6. The air intake structure for a vehicle as claimed in claim 1, wherein the air intake duct has the front end opening defined at a front end thereof, the front end opening being positioned at a heightwise position level with the air intake port of the supercharger or above it.

7. The air intake structure for a vehicle as claimed in claim 1, wherein a lowermost portion of an undersurface of the air intake duct is provided at an intermediate location of the air intake duct with respect to the forward and rearward directions,
wherein a drain hole is provided in the lowermost portion.

8. The air intake structure for a vehicle as claimed in claim 1, wherein the air intake duct is disposed on one side of the engine and further comprising a valve driving force transmitting mechanism to transmit the power of the engine into intake and exhaust valves, the valve driving force transmitting mechanism being disposed on the other side opposite to such one side of the engine.

9. The air intake structure for a vehicle as claimed in claim 1, wherein the air intake duct comprises:
a first duct portion, which extends in a forward and rearward direction of the vehicle body while passing on one side of the engine from forwardly of the vehicle body; and
a second duct portion which is continued to a rear end of the first duct portion and is curved in towards an inner side of the vehicle body, the second duct portion being fluidly connected with the air intake port of the supercharger at a location rearwardly of the cylinder block, wherein:
the air intake port is disposed on an inner side of the one side of the engine with respect to a vehicle widthwise direction; and the second duct portion is formed with an air reserving portion having a passage surface area that is set to be greater than the first duct portion.

10. The air intake structure for a vehicle as claimed in claim 1, wherein at an intermediate portion of the air intake duct, a high order portion positioned above the front end opening at the front end of the air intake duct is formed.

11. The air intake structure for a vehicle as claimed in claim 1, which engine is mounted on an automotive vehicle having an vehicle frame structure, the vehicle frame structure extending from a handlebar post towards the rear of the vehicle body on an inner side of a side surface of the engine on that side in which the air intake duct is disposed.

12. The air intake structure for a vehicle as claimed in claim 1, wherein the supercharger includes a discharge port disposed at a portion intermediate of the widthwise direction.

13. The air intake structure for a vehicle as claimed in claim 1, wherein the supercharger sucks the intake air from one side of the widthwise direction, and then, supplies it into the engine in a direction perpendicular to the widthwise direction.

14. The air intake structure for a vehicle as claimed in claim 1, wherein a discharge port of the supercharger has an axial line that is tilted forward and upwardly.

15. A motorcycle which comprises:
the air intake structure for a vehicle as defined in claim 1; and
a front wheel support arm extending forwardly from a vehicle frame structure to support the front wheel at a location below the air intake duct.

16. The motorcycle as claimed in claim 15, wherein the air intake duct is disposed on one side of a motorcycle body where a kickstand is disposed.

17. The motorcycle as claimed in claim 16, wherein an air cleaner is mounted in the air intake duct at a position forward from the front wheel support arm.

18. An air intake structure for a vehicle including an engine having an engine rotary shaft extending in a widthwise direction of a vehicle body, which engine comprises:
a crankcase to support the engine rotary shaft;
a cylinder block to protrude upwardly from the crankcase;
a cylinder head mounted on the cylinder block;
a supercharger disposed rearwardly of the cylinder block, above the crankcase, and operable to supply an intake air to the engine under pressure; and
an air intake duct with a front end opening is fluidly connected with an air intake port of the supercharger and operable to guide an incoming wind, which flows forwardly of the engine, towards the supercharger, in which the air intake port of the supercharger is positioned below a vertical height of an upper end of the cylinder head;
the air intake duct extends upward in vertical height above the front end opening before extending downward to pass across a widthwise lateral space of the cylinder block and then back through below the cylinder head;
the air intake duct has an inner side surface with respect to the widthwise direction, the inner side face being curved at a position forwardly of the air intake port of the supercharger in a direction inwardly of the vehicle widthwise direction towards a rear; and
the supercharger includes a centrifugal impeller and the air intake port of the supercharger opens on one side in the widthwise direction.

19. An air intake structure for a vehicle including an engine having an engine rotary shaft extending in a widthwise direction of a vehicle body, which engine comprises:
a crankcase to support the engine rotary shaft;
a cylinder block to protrude upwardly from the crankcase;
a cylinder head mounted on the cylinder block;
a supercharger disposed rearwardly of the cylinder block and above the crankcase and operable to supply an intake air to the engine under pressure;
an air intake chamber mounted above the supercharger for delivery of air to the engine;
an air intake duct with front end opening fluidly connected with an air intake port of the supercharger and operable to guide an incoming wind, which flows forwardly of the engine, towards the supercharger, in which
the supercharger air intake port is positioned below an upper end of the cylinder head;
the air intake duct passes across a lateral space of the cylinder block and below the cylinder head;
the air intake duct has an inner side surface with respect to the widthwise direction, the inner side face being curved at a position forwardly of the air intake port of the supercharger in a direction inwardly of the vehicle widthwise direction towards a rear; and
the supercharger includes a centrifugal impeller and the air intake port of the supercharger opens on one side in the widthwise direction for connection with the air intake duct and a supercharger discharge port extends upward along a rear side of the supercharger for connection with the air intake chamber.

20. A motorcycle which comprises:
the air intake structure for a vehicle as defined in claim 19; and
a front wheel support arm extending forwardly from a vehicle frame structure to support the front wheel at a location below the air intake duct, wherein an air cleaner is mounted in the air intake duct at a position forward from the front wheel support arm.

* * * * *